Feb. 27, 1962  H. C. EDWARDS  3,023,057
AXLE BEARING ADJUSTING MEANS
Filed July 30, 1958
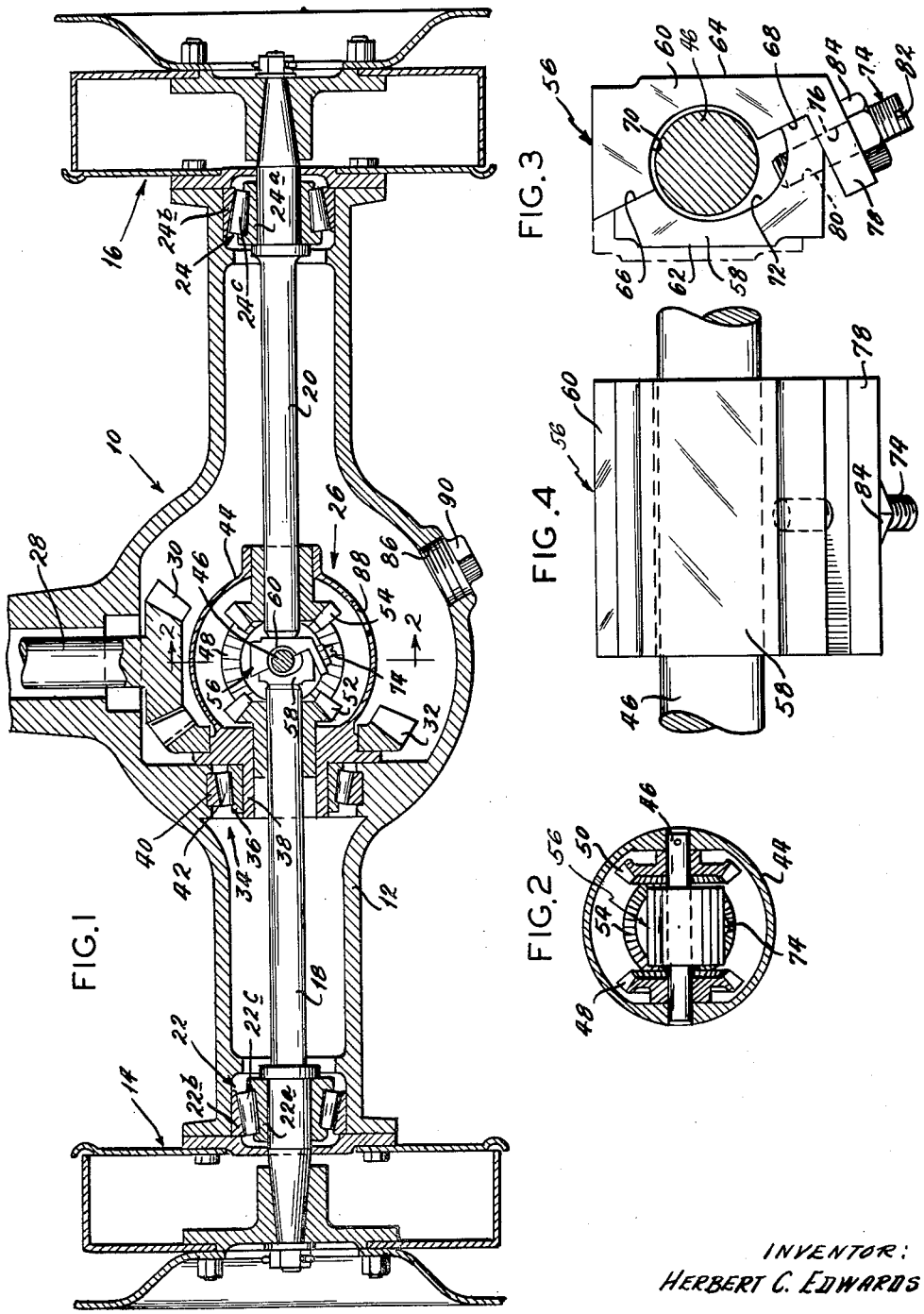
INVENTOR:
HERBERT C. EDWARDS
By Gravely, Lieder & Woodruff
ATTORNEYS.

United States Patent Office 3,023,057
Patented Feb. 27, 1962

3,023,057
AXLE BEARING ADJUSTING MEANS
Herbert C. Edwards, Canal Fulton, Ohio, assignor to The Timken Roller Bearing Company, Canton, Ohio, a corporation of Ohio
Filed July 30, 1958, Ser. No. 751,909
5 Claims. (Cl. 308—207)

The present invention relates to bearing structures in general and more particularly to adjustment means for positioning loaded bearing members, such as vehicle axle bearings.

Various means have heretofore been devised for adjusting and distributing the load on bearing members such as the bearing members associated with vehicle axles. The known means employ trial and error techniques such as shimming and are not versatile enough or flexible enough to distribute the load between opposed bearing assemblies such as are located at opposite ends of an axle assembly. These and other disadvantages of the known means are overcome by the present device.

Briefly, the present device comprises the addition to a journaled axle structure having bearing assemblies located at opposite ends thereof and axle sections extending therebetween of a composite block positioned between the axle sections, said composite block having separate block portions with opposed axle engaging surfaces and adjacent cooperating angularly related surfaces, and a threaded connector cooperatively engaged with said block portions and adjustable for changing the position of engagement of the angularly related surfaces and the spacing between said opposed block surfaces.

It is an object of the present invention to provide relatively inexpensive means for axially adjusting the load on opposed bearing assemblies.

Another object is to eliminate the need to stock parts for adjusting the bearing load on axle bearing assemblies.

Another object is to provide relatively simple means by which one person can simultaneously adjust and distribute the axial load on opposed bearing assemblies.

Another object is to provide means for loading opposed bearing assemblies which means are accurately adjustable.

Another object is to provide means fos accurately adjusting the load on rear axle bearing assemblies and the like which can be installed as original equipment or added to existing equipment with minimum change to the assembly.

Other objects and advantages of the invention will become apparent after considering the following specification in conjunction with the accompanying drawing.

In the drawing:

FIG. 1 is a longitudinal cross-sectional view through the center of a rear axle assembly showing bearing load adjusting means therein constructed according to the teachings of the present invention, FIG. 2 is a cross-sectional view taken along line 2—2 of FIG. 1, FIG. 3 is an enlarged cross-sectional view of the rear axle adjusting means per se, showing in phantom outline an alternative adjusted position thereof, and FIG. 4 is a view of the adjusting means of FIG. 3 as seen from the left therein.

Referring to the drawings by reference numbers, the number 10 in FIG. 1 refers to an axle assembly such as a differential axle assembly on an automobile, tractor, or other vehicle. The axle assembly 10 is positioned in a housing 12, and includes a left wheel assembly 14, a right wheel assembly 16, a left axle section 18, a right axle section 20, a left bearing assembly 22, a right bearing assembly 24, and a differential gear assembly 26. Power is supplied to the rear axle sections 18 and 20 and to their associated wheel assemblies 14 and 16, respectively, by means of a drive shaft 28.

The differential gear assembly 26 includes a driving gear 30 attached to the end of the drive shaft 28. The gear 30 is meshed at right angles with a driven gear 32, and the driven gear 32 is rotatively mounted in the housing 12 by a bearing assembly 34 which has an inner race 36 mounted on a sleeve portion 38 of the driven gear 32, an outer race 40 mounted in a recess in the housing 12, and a ring of anti-friction members 42 between said races. The driven gear 32 is also attached to an inner housing member 44 which carries a pinion shaft 46 set at right angles to the axes of axle sections 18 and 20. The ends of the pinion shaft 46 adjacent the housing member 44 rotatably carry pinion gears 48 and 50 which are engaged at right angles with gears 52 and 54. The gears 52 and 54 are fixedly mounted on the ends of the axle shaft sections 18 and 20 respectively and are slidably positioned in the driven gear 32 and in the housing member 44, respectively.

Motion is transmitted from the drive shaft 28 to the wheel assemblies 14 and 16 through the driving gear 30 to the driven gear 32, the rotating inner housing 44 to the pinion shaft 46, to the pinion gears 48 and 50 and finally to the gears 52 and 54 and the shaft sections 18 and 20.

A composite block 56 for adjusting the axial load on the wheel bearing assemblies 22 and 24 is positioned between the adjacent ends of the axle sections 18 and 20 and constitutes the most important part of the present invention. The composite block 56 is formed of two portions 58 and 60 having opposed surfaces 62 and 64 (FIG. 3) which engages the adjacent ends of the axle sections 18 and 20 respectively. The surfaces on the block portions 58 and 60 opposite from surfaces 62 and 64 are identified by numbers 66 and 68 respectively and are angularly disposed relative to the surfaces 62 and 64. A passage is formed through the block 56 by a semi-circular channel 70 in the surface 68 of the block portion 60 and a relatively wider channel 72 is formed in the surface 66 of the block portion 58. When the block portions 58 and 60 are positioned with surfaces 66 and 68 in engagement (FIGS. 1 and 3), the channel portions 70 and 72 rotatably receive the central portion of the pinion shaft 46 therethrough and the width of the channel 72 enables the block portion 58 to be moved relative to the block portion 60 while maintaining a large enough passage therethrough for rotatably accommodating the pinion shaft 46.

The block portions 58 and 60 are threadedly connected together by means of a threaded member 74. The member 74 extends through a threaded opening 76 in a flange 78 on block portion 60 and through another threaded opening 80 in the block portion 58. One of the threaded openings has left-hand threads and the other right-hand threads, and the threaded member 74 has left and right hand threads over its opposite end portions which cooperate with the threads in said openings 76 and 80. The outer end of the threaded member 74 is also provided with a screw driver slot 82 for adjustment purposes, as will be shown hereinafter, and a lock nut 84 is provided on the threaded member 74 for engagement with the flange 78 to retain an adjustment of the member 74.

When the device is to be adjusted, the lock nut 84 is loosened, and a screw driver is used in the slot 82 to change the positional relationship of the block portions 58 and 60. In the position shown in solid lines in FIG. 3, the block portions 58 and 60 have minimum transverse dimension (between surfaces 62 and 64), and in the position shown in phantom outline the transverse dimension has been increased by rotating the screw 74 in a direction to move the block portion 58 away from the flange 78. Since the composite block 56 is positioned between the aligned axle sections 18 and 20 changes in the transverse dimension of the block 56 changes the spacing between the shaft sections 18 and 20 and thereby changes the load on the bearing assemblies 22 and 24.

Changes in the load on the bearing assemblies is effected because the assemblies have tapered bearing cones 22a and 24a and tapered cups 22b and 24b with antifriction members 22c and 24c therebetween. Therefore, increases in the spacing between the shafts 18 and 20 moves the bearing cones 22a and 24a outwardly and increases the load on the assemblies, while decreases in the spacing between the shafts 18 and 20 has the opposite effect.

In order that adjustment may be made without disassembling the rear axle, an opening 86 is provided through the housing 12 and another opening 88 is provided through the inner housing member 44. A plug 90 is threadedly positioned in the opening 86 to prevent loss of lubricant therefrom and is removed when the block 56 is adjusted. Alignment of the openings 86 and 88 with the adjusting member 74 is easily accomplished by rotating the drive shaft or a wheel when the plug 90 is removed and the vehicle is in raised position. In this way the inner housing member 44 rotates relative to the housing 12 and alignment of the openings 86 and 88 can be observed. When the openings are in alignment the lock nut 84 is loosened by a suitable wrench permitting adjustment of the threaded member 74 with a screw driver. After the adjustment is completed the lock nut 84 is retightened and the plug 90 re-installed in the opening 86. Depending on the location of the opening 86 it may also be necessary to remove lubricant from the differential assembly 26 when adjusting.

Whether the present device is installed as original equipment or as an accessory it is usually desirable to effect initial adjustment when the transverse block dimension is at a minimum. By so providing, maximum possible remaining adjustment is available in the block to compensate for wear.

Thus, it is apparent that there has been provided novel means for simultaneously adjusting the axial load on bearing assemblies such as those associated with rear axle assemblies and the like which fulfill all the objects and advantages sought therefor. It is also apparent that simple means have been provided by which one person can adjust and distribute the load on such bearing assemblies in minimum time, using ordinary hand tools and without having to stock separate parts therefor.

Changes, modifications, and alterations in the particular construction disclosed in this specification will be readily apparent to those skilled in the art. All such changes, modifications and alterations which do not depart from the spirit and scope of the present invention are deemed to be covered by the present invention which is limited only by the claims which follow.

What is claimed is:

1. A device for adjusting the spacing between the rear axle shaft sections on a vehicle having a rear axle assembly having juxtaposed left and right rear axle sections, wheel bearing assemblies positioned at the ends of said shaft sections, a differential drive operatively positioned between the adjacent ends of said shaft sections, the improvement comprising a divided block assembly positioned in the differential drive between adjacent ends of the axle shaft sections, said block assembly having opposed axle shaft engaging surfaces and said block assembly including two block portions abutting on a plane angularly related to the axis of the axle sections, threaded means connecting said block portions and adjustable therein for changing the position of abutment of the angular abutting surfaces whereby the spacing between the opposed axle section engaging surfaces is changed, said adjustable means including a threaded member having a right-hand threaded portion cooperatively engaged with one of said block portions and a left-hand threaded portion cooperatively engaged with said other block portion, and means associated with one of said block portions for locking the threaded member thereto.

2. Means for adjusting the axial spacing between aligned and relatively rotatable shaft sections having bearing assemblies positioned adjacent opposite ends thereof comprising a pair of spaced aligned shaft sections having axially loadable bearing assemblies located at opposite ends thereof and having spaced opposed surfaces on adjacent ends thereof, a split block positioned between the opposed surfaces on the adjacent ends of the shaft sections, said block including two portions having opposed shaft engaging surfaces and adjacent abutting surfaces angularly related to the axis of the shaft sections, means for changing the positional engagement of said abutting surfaces whereby the spacing between said opposed surfaces and between the shaft sections, and the axial load on the bearing assemblies is adjusted, and means including a pinion shaft cooperatively engaged with said block for retaining said block in position between said shaft sections.

3. Means for adjusting the spacing between aligned and relatively rotatable shaft sections comprising a pair of spaced relatively rotatable aligned shafts, gear means connected between adjacent ends of said shafts, a divided block assembly positioned between said shafts, said assembly having opposed shaft engaging surfaces thereon, and said assembly including separate portions abutting on a plane angularly related to the axis of said shafts, means associated with the gear means and cooperating with said assembly to retain the assembly in position between the shafts, and adjustable threaded means connecting said separate block portions for changing the positional abutment of said portions and the spacing between said shafts.

4. Means for adjusting the spacing between axially aligned relatively rotatable shafts comprising two spaced aligned and relatively rotatable shafts, a divided block assembly having opposed shaft engaging surfaces thereon positioned in the space between said shafts, said block assembly having separate portions abutting on a plane angularly relating to the axis of said shafts, an adjustable element threadedly connecting said block portions and having oppositely threaded portions engaged in each of said block portions, means for locking the position of said adjustable element to retain an adjustment position thereof, an opening through said block assembly, and means extending through said opening and cooperating to retain the assembly in position between the shafts.

5. Means for adjusting the spacing between adjacent ends of relatively rotatable aligned shaft members to provide running clearance therebetween comprising a pair of relatively rotatable shaft members having spaced adjacent ends, a block assembly positioned between said adjacent shaft ends and having opposed shaft engaging surfaces, said block assembly including a pair of engaged block portions each having a first surface cooperatively engaged with a different one of said adjacent ends of said shaft members, a second surface on each of said block portions being in surface to surface abutment, threaded means connecting said block portions and being adjustable for changing the positional engagement of said second block surfaces, said threaded means including means engageable with one of said block portions for locking said threaded means to retain a position of adjustment thereof, and means operatively connected between adjacent shaft ends, said last named means including gear means and means associated therewith and engaged with the block assembly.

References Cited in the file of this patent

UNITED STATES PATENTS

| | | |
|---|---|---|
| 416,966 | Stiles | Dec. 10, 1889 |
| 464,921 | Carr | Dec. 8, 1891 |
| 503,691 | Ball | Aug. 22, 1893 |
| 1,306,678 | Smith | June 10, 1919 |
| 1,513,966 | Church | Nov. 4, 1924 |
| 1,655,133 | Clase | Jan. 3, 1928 |
| 2,004,264 | Wyrick | June 11, 1935 |
| 2,547,789 | Skeel | Apr. 3, 1951 |
| 2,557,702 | Soukup et al. | June 19, 1951 |
| 2,865,229 | Hodanek | Dec. 23, 1958 |